United States Patent [19]
Honda

[11] Patent Number: 5,852,236
[45] Date of Patent: Dec. 22, 1998

[54] FLUID MEASURING PROBE

[75] Inventor: Hideyuki Honda, Kyoto, Japan

[73] Assignee: Honda Engineering Co., Ltd., Osaka, Japan

[21] Appl. No.: 856,236

[22] Filed: May 14, 1997

[30] Foreign Application Priority Data

May 15, 1996 [JP] Japan .................................. 8-119836

[51] Int. Cl.⁶ ..................................................... G01F 1/68
[52] U.S. Cl. ......................................................... 73/170.15
[58] Field of Search ........................... 73/170.12, 170.15, 73/170.11

[56] References Cited

U.S. PATENT DOCUMENTS

| | | | |
|---|---|---|---|
| 3,552,204 | 1/1971 | Tourmen | 73/170.15 |
| 4,788,869 | 12/1988 | Li | 73/170.15 |
| 4,856,330 | 8/1989 | Honda et al. | 73/170.12 |
| 5,117,687 | 6/1992 | Gerardi | 73/170.15 |

*Primary Examiner*—Ronald L. Biegel
*Attorney, Agent, or Firm*—Armstrong, Westerman, Hattori, McLeland & Naughton

[57] ABSTRACT

In a traverse device mounting type or handy type fluid measuring probe in which a plurality of conductive lines are connected to a contact type sensor element and the conductive lines are covered by a support member, or a test member attachment type fluid measuring probe, a fluid measuring probe is provided in which when the probe head or the support member is brought into contact with other things, an impact force is moderated and a damage of the probe head and the support member is suppressed. When a pressure that is not less than a predetermined pressure is applied to the support member in a direction perpendicular to a longitudinal direction of the support member, the support member may be bent; when the pressure is released, the support member may be restored; and when the pressure that is not less than the predetermined pressure is not applied, the support member may maintain a predetermined posture.

12 Claims, 13 Drawing Sheets

PRIOR ART

FLUID MEASURING PROBE

BACKGROUND OF THE INVENTION

1. Field of the Invention

The present invention relates to a fluid measuring probe, and more particularly to a fluid measuring probe having an impact resistivity for measuring a fluid flow rate within, for example, a wind tunnel test device or a duct by using a contact type flow rate sensor element made of a monocrystalline germanium semiconductor or measuring a fluid temperature by using a contact type temperature sensor element made of thermistor.

2. Description of the Related Art

Figure 16:
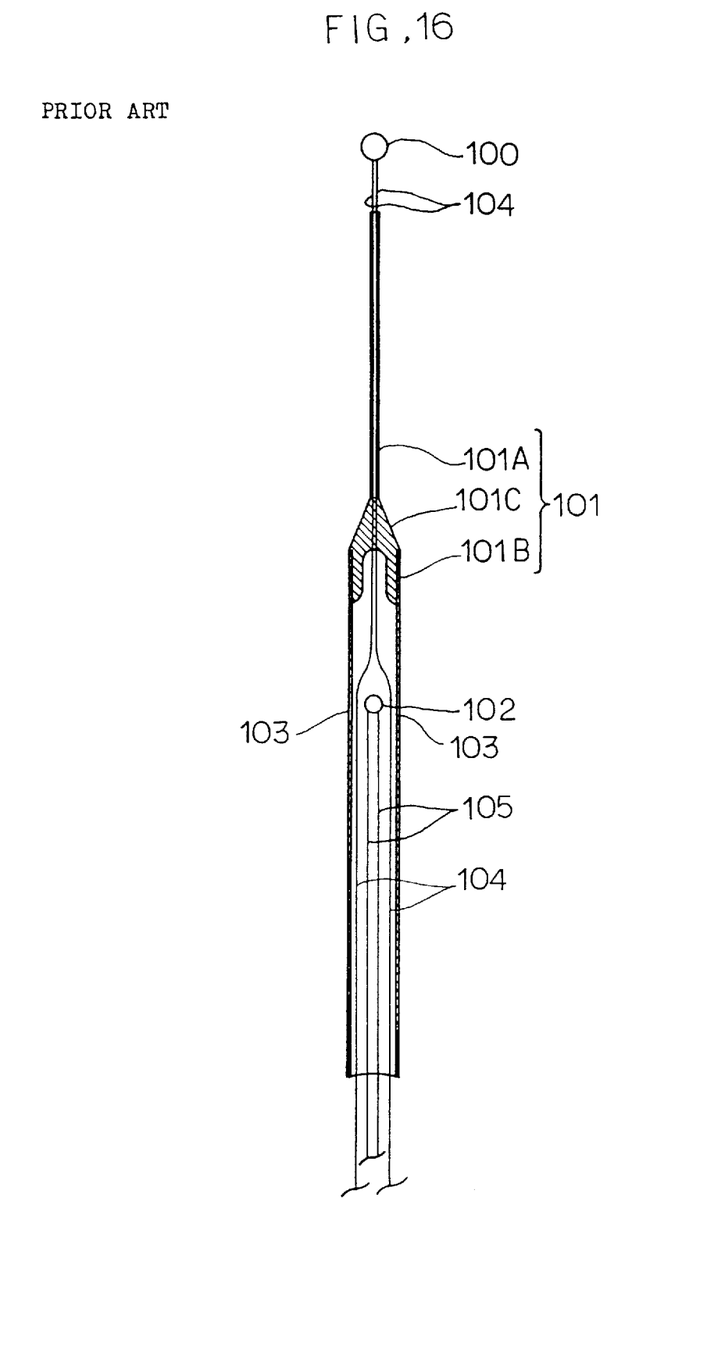
FIG. 16 is a partially omitted cross-sectional view showing a conventional fluid measuring probe.

A variety of conventional fluid measuring probes for measuring a fluid flow rate or a fluid temperature have been provided. For instance, an example of a handy type fluid measuring probe or a fluid measuring probe which may be mounted on a traverse device is shown in FIG. 16. The fluid measuring probe is constructed as follows. A probe head 100 incorporating a contact type flow rate sensor element is fixed to a tip end of a support member 101 having an outer diameter gradually decreased toward the tip end. A probe head 102 incorporating a contact type temperature sensor element is received in an intermediate portion of the support member 101. An opening 103 is formed in the support member 101 so that the probe head 102 may project from the opening 103. Two conductive lines 104 and 104 made of phosphor bronze and connected to the contact type flow rate sensor element located at the tip end of the support member 101 and two conductive lines 105 and 105 made of phosphor bronze and connected to the contact type temperature sensor element located in the intermediate portion of the support member 101 are caused to pass through the interior of the cylindrical support member 101. The support member 101 is composed of a thin first stainless steel pipe 101A located on the tip end side, a large second stainless steel pipe 101B located on the proximal end side, and a tapered joint pipe 101C made of aluminum for coupling these stainless steel pipes 101A and 101B.

However, in the case where the thus constructed fluid measuring probe is transported or mounted on a movable portion of the traverse device, there is a fear that the fluid measuring probe would be collided against other things. Due to the impact force caused by the collision, the stainless steel pipes 101A and 101B would be damaged or the probe head 100 incorporating the contact type flow rate sensor element would be damaged. Although it would be possible to absorb the small impact due to the fact that the two conductive lines 104 and 104 per se are bent to some extent, the conductive lines 104 and 104 could not stand the large impact so that the conductive lines would be sometimes broken.

SUMMARY OF THE INVENTION

In view of the circumstances above, an object of the present invention is to provide a fluid measuring probe which may moderate an impact upon collision with other things and which is free from a damage.

According to the present invention, in order to solve the above-noted defects, there is provided a traverse device mounting type or handy type fluid measuring probe in which a plurality of conductive lines are connected to a contact type sensor element and the conductive lines are covered by a support member, characterized in that when a pressure that is not less than a predetermined pressure is applied to the support member in a direction perpendicular to a longitudinal direction of the support member, the support member may be bent; when the pressure is released, the support member may be restored; and when the pressure that is not less than the predetermined pressure is not applied, the support member may maintain a predetermined posture. Accordingly, in the case where the fluid measuring probe is transported or is mounted on the traverse device, even if the fluid measuring probe is brought into contact with the other things, the support member is bent to moderate the impact force and elastically restored to the original posture and maintained its posture.

The support member is composed of a plurality of cylindrical members arranged at a predetermined interval in the vertical direction, and the adjacent cylindrical members are connected to each other by an extending/contracting tube. Accordingly, the extending/contracting tube is expanded or shrunken to thereby moderate the impact force at this time. When the contact is released, the cylindrical members are restored to the predetermined posture by an elastic force of the extendable/shrinkable tube to keep its posture.

The adjacent cylindrical members are connected to each other by a coil spring, and the coil spring is covered by a thin extending/contracting tube for connecting the adjacent cylindrical members to each other. Accordingly, the coil spring is deformed upon the contact, the impact may be moderated. When the contact is released, the cylindrical members are returned back to an original posture by an elastic force of the coil spring to maintain the posture. Incidentally, the thin extending/contracting tube is made thin to be readily extended or contracted upon the contact.

Also, according to the present invention, there is provided a test member attachment type fluid measuring probe in which a support member through which at least two conductive lines pass is vertically provided at a center of an upper end of a mount base having a heat insulating property, and a probe head whose sensor element is coated with a coating member is fixed to a tip end of the support member, characterized in that when a pressure that is not less than a predetermined pressure is applied to the support member in a direction perpendicular to a longitudinal direction of the support member, the support member may be bent; when the pressure is released, the support member may be restored; and when the pressure that is not less than the predetermined pressure is not applied, the support member may maintain a predetermined posture. Also in this case, in the case where the probe head or the support member is collided with other things or an impact is applied thereto, the support member is bent and elastically restored to the original posture and maintained its posture to prevent any damage of the probe head or the support member.

DESCRIPTION OF THE PREFERRED EMBODIMENTS

Figure 1:
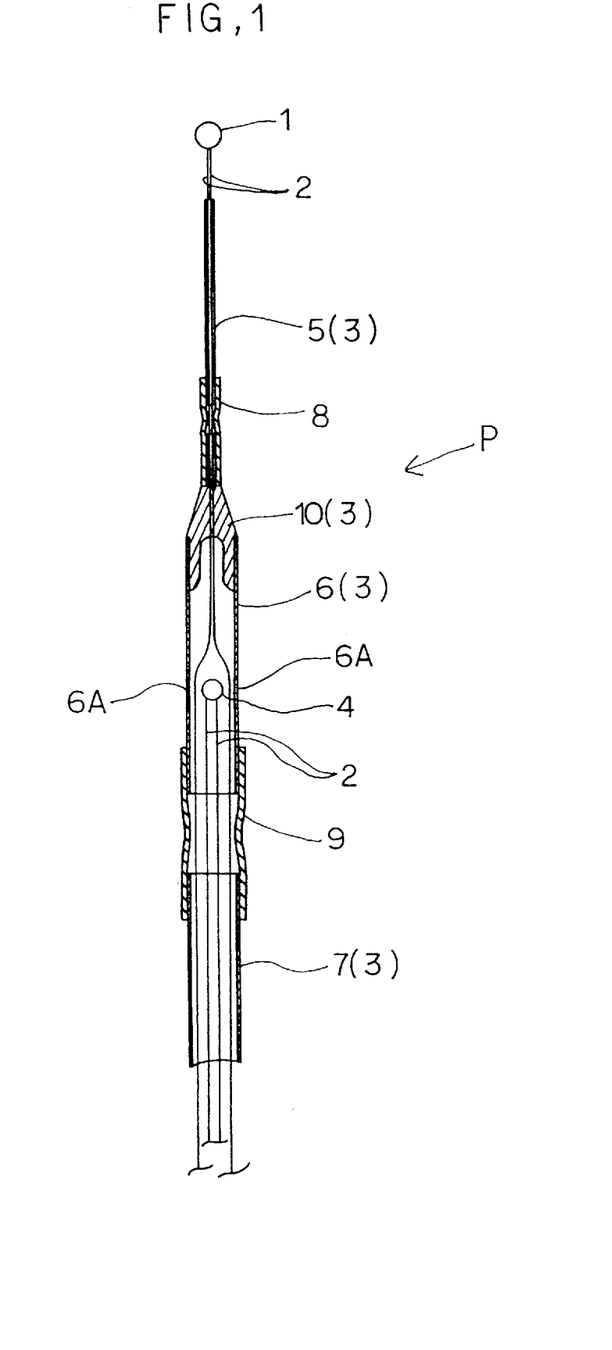
FIG. 1 is a partially omitted cross-sectional view of a traverse device mounting type or handy type fluid measuring probe P.
Figure 2:
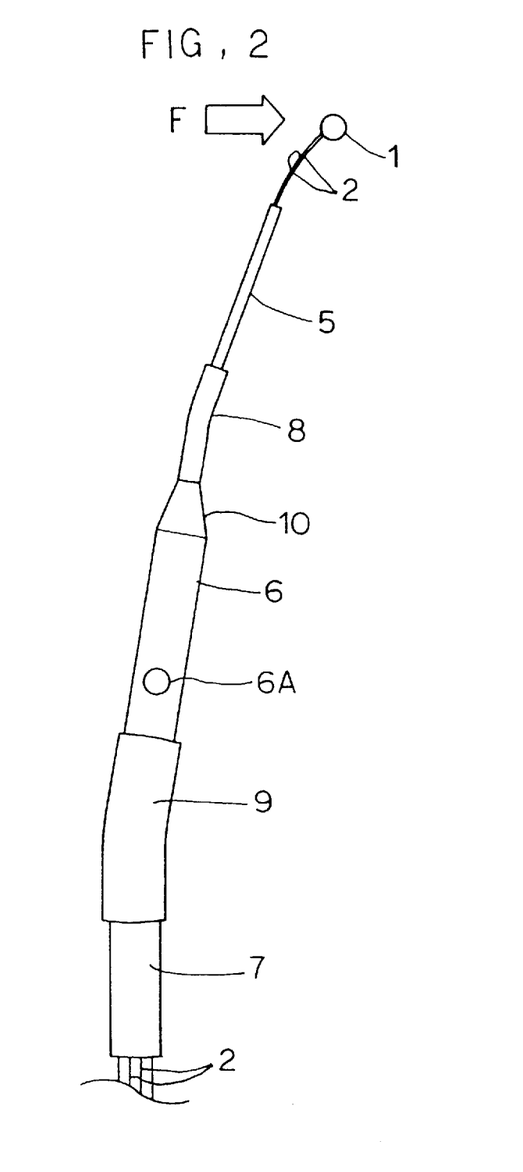
FIG. 2 is a partially omitted illustration showing a bent condition of the fluid measuring probe.

The present invention will now be described with reference to the accompanying drawings. FIGS. 1 and 2 show a fluid measuring probe P to be mounted on a traverse device (not shown) for detecting an air flow rate (a wind velocity) and an air temperature in the vicinity of a test member within a wind tunnel. It is possible to conduct a fluid dynamic analysis of the test member on the basis of the detection results of the fluid measuring probe P. Also, in the case where the probe is mounted within a duct, it is possible to operate or stop a blower automatically. Also, it is possible to make a decision as to whether a filter of an air conditioner is clogged or not. Also, it is possible to form a simplified air flow meter for indicating the flow rate within the duct.

The fluid measuring probe P is provided with a probe head 1 incorporating a contact type fluid sensor element, two conductive lines 2 and 2 made of phosphor bronze and connected to the flow rate sensor element of the probe head 1, a support member 3 for covering these conductive lines 2 and 2 and supporting the probe head 1, a probe head 4 incorporating a contact type temperature sensor element in the support member 3, and two conductive lines 2 and 2 made of the same material as that of the above-described lines and connected to the temperature sensor element of the probe head 4. It is possible to constitute the fluid measuring probe P with either one of the flow rate measuring probe head 1 and the temperature measuring probe head 4.

The above-described probe head 1 is composed of the flow rate sensor element made of a small piece of monocrystalline germanium semiconductor containing a suitable a mount of impurities, and a resin layer coating the small piece with thermosetting synthetic resin such as epoxy resin or the like. The shape of the probe head 1 is formed into a sphere. Then, a voltage is applied to the small piece so that the flow rate measuring small piece per se is heated at a constant temperature. Under this condition, when the fluid is brought into contact with the resin layer, a heat quantity of the small piece is discharged corresponding to the flow rate of the fluid that is brought into contact with the small piece. Due to the temperature change of the small piece caused by the heat discharge, an electric resistivity of the small piece is changed. The change amount is converted into the voltage, current or electric power. Based upon these results, the flow rate of the fluid is calculated.

The above-described probe head 4 is constructed in the same way by coating, with a thermosetting synthetic resin, the temperature sensor element made of a thermistor or a thermocouple as a resistor that is thermally sensitive for detecting the temperature of the fluid through the contact with the fluid. The temperature detection principle by the probe head 4 incorporating this temperature sensor element is well known and explanation therefor will be omitted.

The above-described support member 3 is composed of a plurality (three in the drawings) of cylindrical members 5, 6 and 7 arranged at a predetermined interval along a straight line. These cylindrical members 5, 6 and 7 are connected to each other by using two kinds of rubber made extending/contracting tubes 8 and 9 having different diameters. Accordingly, when the fluid measuring probe P is brought into contact with other things and as shown in FIG. 2, a pressure F that is not less than a predetermined pressure is applied to the fluid measuring probe P, the extendable tubes 8 and 9 are bent as shown, so that the impact force may be moderated upon the collision. Then, when the contact is released, the cylindrical members 5, 6 and 7 are returned back to a predetermined posture by the elastic force of the extendable tubes 8 and 9. The posture is maintained. Incidentally, since the support member 3 is divided into the plurality of cylindrical members 5, 6 and 7, the conductive lines 2 and 2 may be inserted into the short cylindrical members 5, 6 and 7, respectively. This makes it easy to insert the conductive lines 2 and 2 in comparison with the case where the conductive lines 2 and 2 are inserted into a single long support member 3. Also, in order not to bring the conductive lines 2 and 2 into contact with each other in the interior, where the extending/contracting tubes 8 and 9 are bent, for example, adhesives may be applied to the surface of the conductive lines 2 and 2, and the conductive lines 2 and 2 may be fixed at several positions in the inner surface of the support member 3. In this case, in order to allow the extending/contracting tubes 8 and 9 to be bent, it is necessary to set, at a somewhat larger length, portions of the conductive lines 2 and 2 which are not fixed in place. Two portions of the fluid measuring probe P that may be bent are provided but the bendable portion may be set at one position or three or more positions. Also, the elastic force of the two extending/contracting tubes 8 and 9 may be kept constant but the elastic force of one of the extending/contracting tubes may be made different from that of the other extending/contracting tube. Also, the bendable range of the fluid measuring probe P may be determined by an elastic limit of the rubber which is the material for constituting the extending/contracting tubes 8 and 9. In addition, it is possible to limit the structure so that the fluid measuring probe P is bent less than the elastic limit of the rubber.

The above-described cylindrical members 5, 6 and 7 are all made of stainless steel. The cylindrical member on the fluid measuring probe head 1 side, i.e., the cylindrical member 5 located at the tip end portion has a circular cross-sectional area of a diameter smaller than that of the other cylindrical members 6 and 7. Also, the cylindrical member 6 positioned in the middle and the cylindrical member 7 positioned at the proximal end portion have a circular cross-sectional area having the same diameter. A sleeve member 10 made of aluminum and having a cross section as shown is fitted by adhesives or the like around an end portion of the middle cylindrical member 6 on the side of the probe head 1. The tip end portion of the sleeve member 10 on the side of the probe head 1 is inserted into the extending/contracting tube 8. A small through hole is formed in the sleeve member 10 for insertion of the conductive lines 2 and 2. Through-openings 6A and 6A for causing the fluid to flow into the interior and bringing the fluid into contact with the probe head 4 for temperature detection are formed in the intermediate portion of the cylindrical member 6 located in the middle.

Figure 3:
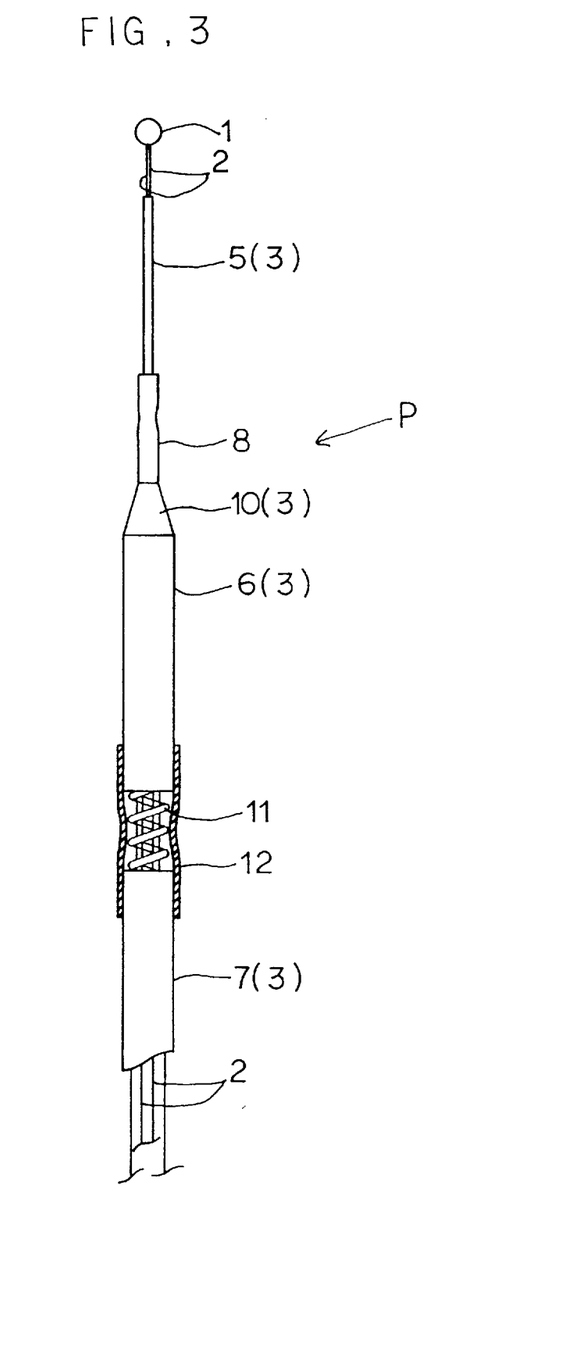
FIG. 3 is a partially fragmentary side elevational view showing a fluid measuring probe according to another embodiment.

FIG. 3 shows the case where a coil spring 11 is provided instead of the extending/contracting tube 9. In order to cover the coil spring 11, an extendable tube 12 which is thinner than the extending/contracting tube 9 couples the cylindrical members 6 and 7 with each other. Accordingly, when the fluid measuring probe P is brought into contact with other things so that a pressure that is not less than a predetermined pressure is applied to the fluid measuring probe P, the extending/contracting tube 12 is bent, and at the same time, the coil spring 11 is elastically deformed. As described above, the fluid measuring probe P is bent so that the impact force upon the collision may be moderated. Then, when the contact is released, the cylindrical member 6 is returned back to a predetermined posture by the elastic restoring force of the extending/contracting tube 12 and the elastic restoring force of the coil spring 11. A thickness of the thin extending/contracting tube 12 is decreased so that it may readily be extended or contracted upon the collision. The elastic force of the extendable tube 12 is set at very small one in comparison with the elastic biasing force of the coil spring 11.

Figure 4:
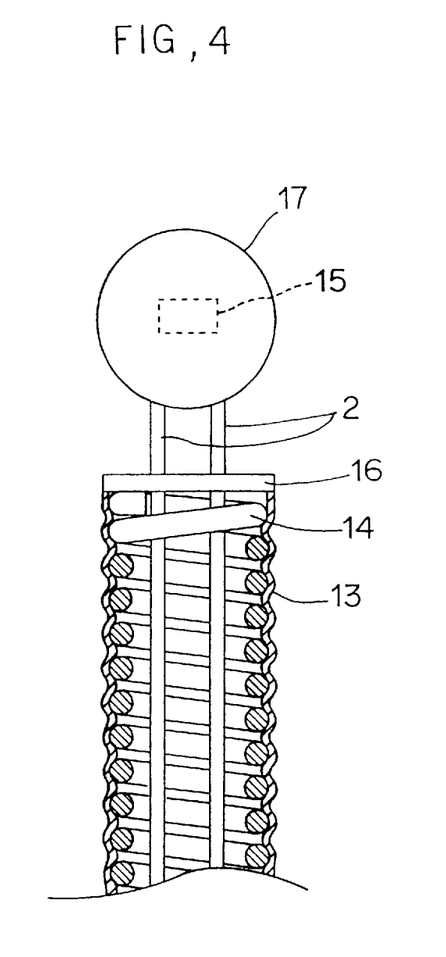
FIG. 4 is a cross-sectional view showing a primary part showing another embodiment of the fluid measuring probe.

FIG. 4 shows an example in which the support member 3 is composed of a single bellows type cylindrical member 13 made of resin and a coil spring 14 inserted into the cylindrical member 13 for maintaining a shape of the cylindrical member 13. In this case, when the fluid measuring probe P is brought into contact with other things, the cylindrical member 13 as a whole may be subjected to distortion so that the impact upon the collision may smoothly be moderated. In FIG. 4, reference numeral 15 denotes a sensor element made of a small piece of mono-crystalline germanium semiconductor in the same manner as described above. The conductive lines 2 and 2 are connected to the flow rate sensor element 15. Also, in FIG. 4, reference numeral 16 denotes a cover member for contacting and supporting an upper end of the coil spring 14.

According to the present invention, the structure in which, when the pressure that is not less than the predetermined pressure in a direction perpendicular to a longitudinal direction of the support member 3 is applied the support member 3, the support member 3 may be bent and may be restored upon the release of the pressure is directed to a structure in which, even if the support member 3 is brought into collision against the other things and a bending stress is applied to the support member 3, the support member 3 is bent to be elastically restorable to the original posture, and even if the probe head 1 is brought into collision with the other things, the support member 3 is bent to be elastically restorable in order to moderate the impact force. Also, the structure in which, when the pressure that is not less than the predetermined pressure is not applied to the support member 3, the support member 3 may be maintained in the predetermined posture is directed to a structure in which the probe head 1 and the support member 3 are disposed in the fluid, and although the fluid pressure is applied to the probe head 1 and the support member 3 under the condition that a regular fluid measurement is conducted, bending of the support member 3 to such an extent that there is no adverse effect against the fluid measurement is allowed. Accordingly, the bending elasticity must be set in view of the material, the outer diameter and the thickness of the extending/contracting tubes 8 and 9, the interval between the cylindrical member 5 and the sleeve member 10 and the interval between the two cylindrical members 6 and 7 in correspondence with the density range and the flow rate range of the fluid to be measured and the temperature range thereof. Also, the spring constant of the coil spring 14 to the bending must be set in view of these factors.

Figure 5:
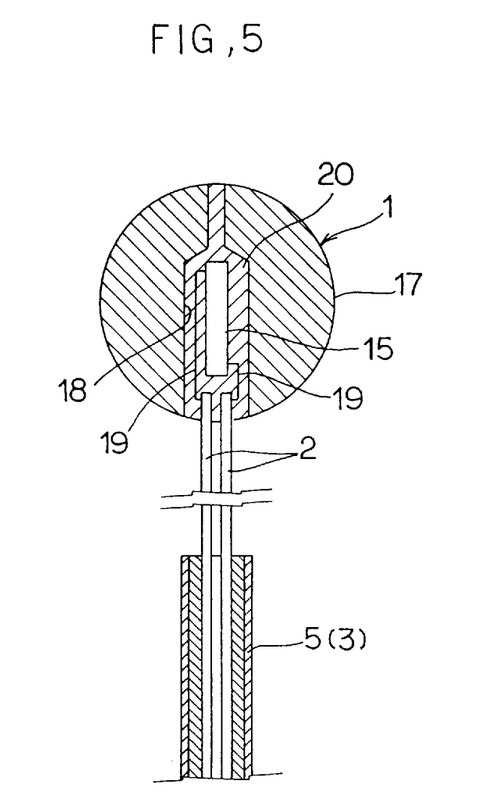
FIG. 5 is a partially fragmentary view showing a structure of a probe head.

A structure of the probe head 1 in the foregoing embodiment will now be briefly described with reference to FIG. 5. The above-described probe head 1 is made of metal having a high heat conductivity. A variety of sensor elements 15 are insulated and embedded in the interior of the coating member 17 formed into a sphere having a diameter of 2.5 mm. Namely, under the condition that the sensor elements 15 are connected and maintained by the lead lines 19 and 19 to the conductive lines 2 and 2 drawn from the end of the support member 3 through an insertion hole 18 formed in the coating member 17, the sensor elements 15 are separated from the inner surface of the insertion hole 18 and inserted into the insertion hole 18. Then, the insertion hole 18 is filled with an insulator 20 made of thermosetting synthetic resin such as epoxy resin or the like and the resin is cured to thereby fasten the sensor elements 15 and fix to the support member 3. Also, the coating member 17 may be made from copper, aluminum, nickel, gold, silver and the like. It is however preferable to use aluminum and nickel in view of the cost and machinability aspects. In the preferred embodiment of the invention, aluminum is used and an anti-corrosive coating is formed on the surface. Also, in the embodiment, epoxy resin is exemplified as the thermal-setting synthetic resin having insulating property. However, in addition thereto, synthetic resin such as silicone resin, aniline resin, phenol resin, polyester resin, and urethane resin may be equally used. Also, in the embodiment, the conductive lines 2 and 2 are exposed in the end portion of the support member 3 but the conductive lines 2 and 2 may be coated with the synthetic resin.

Figure 6:
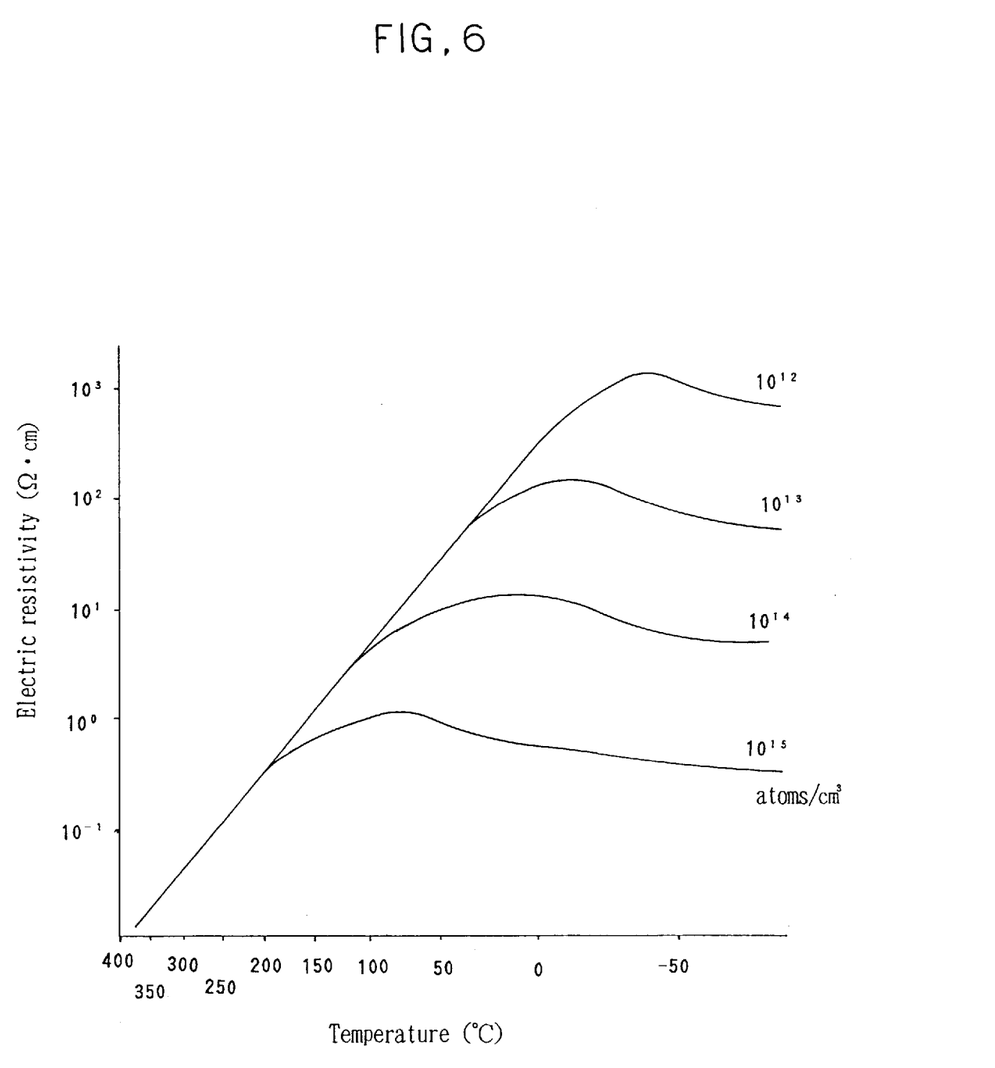
FIG. 6 is a graph showing a relationship between a temperature and an electric resistivity in the case where impurities are changed, while showing electric characteristics of germanium semiconductor used as a sensor element.

A semiconductor that is doped with gallium in the germanium mono-crystal by about $10^{12}$ to $10^{14}$ atoms/cm$^3$ is used as the sensor element 15 for measuring the fluid flow rate. The semiconductor is formed into a parallelepiped shape of 0.3 mm×0.3 mm×1 mm. The semiconductor has characteristics of 300 Ω to several Ω in the temperature range of 0° to 100° C. The characteristics of the sensor element 15 is shown in FIG. 6. This sensor element 15 is sensitive to the temperature change. With this sensor element, it is possible to measure the fluid flow rate with high precision. Namely, it is necessary to use the sensor element that is highly sensitive to the temperature for measuring the flow rate. Incidentally, although it is possible to use the sensor element 15 made of germanium semiconductor for measuring the fluid temperature, it is sufficient to use a thermistor temperature sensor element since high sensitivity is not required for measuring the temperature of the fluid.

Figure 7:
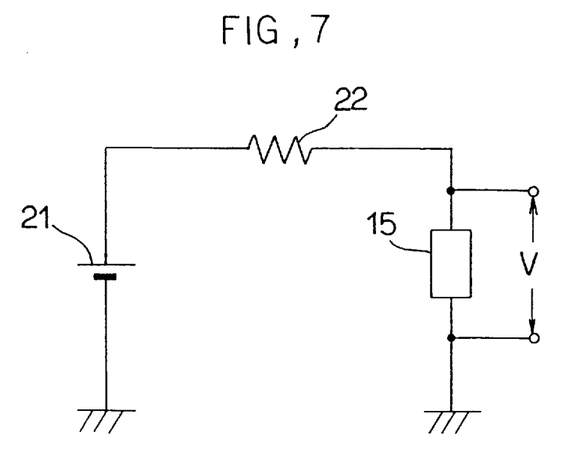
FIG. 7 is a circuit diagram for measuring a fluid flow rate in the case where the fluid temperature is kept constant.

In the fluid measuring probe according to the present invention, in order to measure the fluid flow rate by using the germanium semiconductor as the sensor element 15, the conductive lines 2 and 2 drawn from the support member 3 are connected to a measuring circuit shown in FIG. 7. Namely, a voltage is applied to the sensor element 15 connected in series through a resistor 22 of 400 Ω from a power source 21 whose voltage is set at 30 V. Then, the voltage V between the terminals of the sensor element 15 is measured. In this case, the voltage between the terminals to the respective fluid temperature and flow rate is picked up as the data in the form of the graph or table. The fluid flow rate is calculated on the basis of the data.

Figure 8:
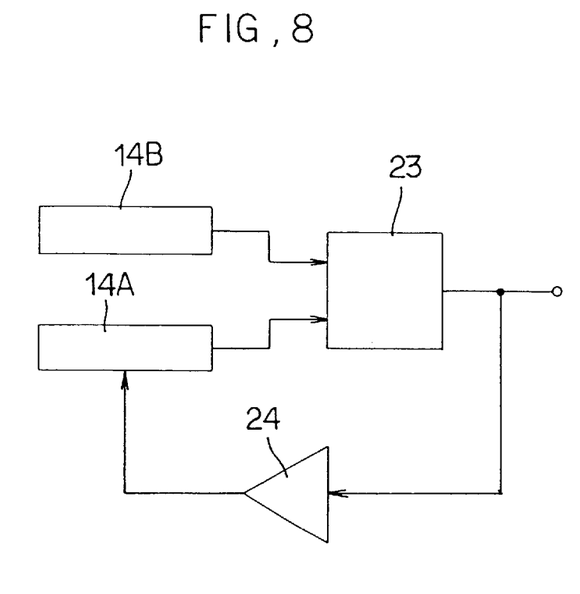
FIG. 8 is a circuit diagram for measuring a fluid flow rate in the case where the fluid temperature is changed.

Also, in the case where the fluid temperature is changed on the time basis, a well known constant temperature circuit shown in FIG. 8 is used. Namely, a constant voltage is applied to the sensor element 15A for measuring the fluid flow rate. The element is heated to a temperature higher than the fluid temperature by an internal resistance. Then, the potential that is elevated while its temperature is lowered due to the contact of the sensor element 15A with the fluid and the potential of the sensor element 15B for measuring the temperature for detecting the fluid temperature are supplied to a bridge circuit 23. The difference between the two potentials is fed back to the sensor element 15B through an amplifier circuit 24 by the bridge circuit 23 so that the temperature of the sensor element 15A is kept constant. The data concerning the fluid flow rate are collected by measuring the potential supplied to the above-described bridge circuit 23.

Figure 9:
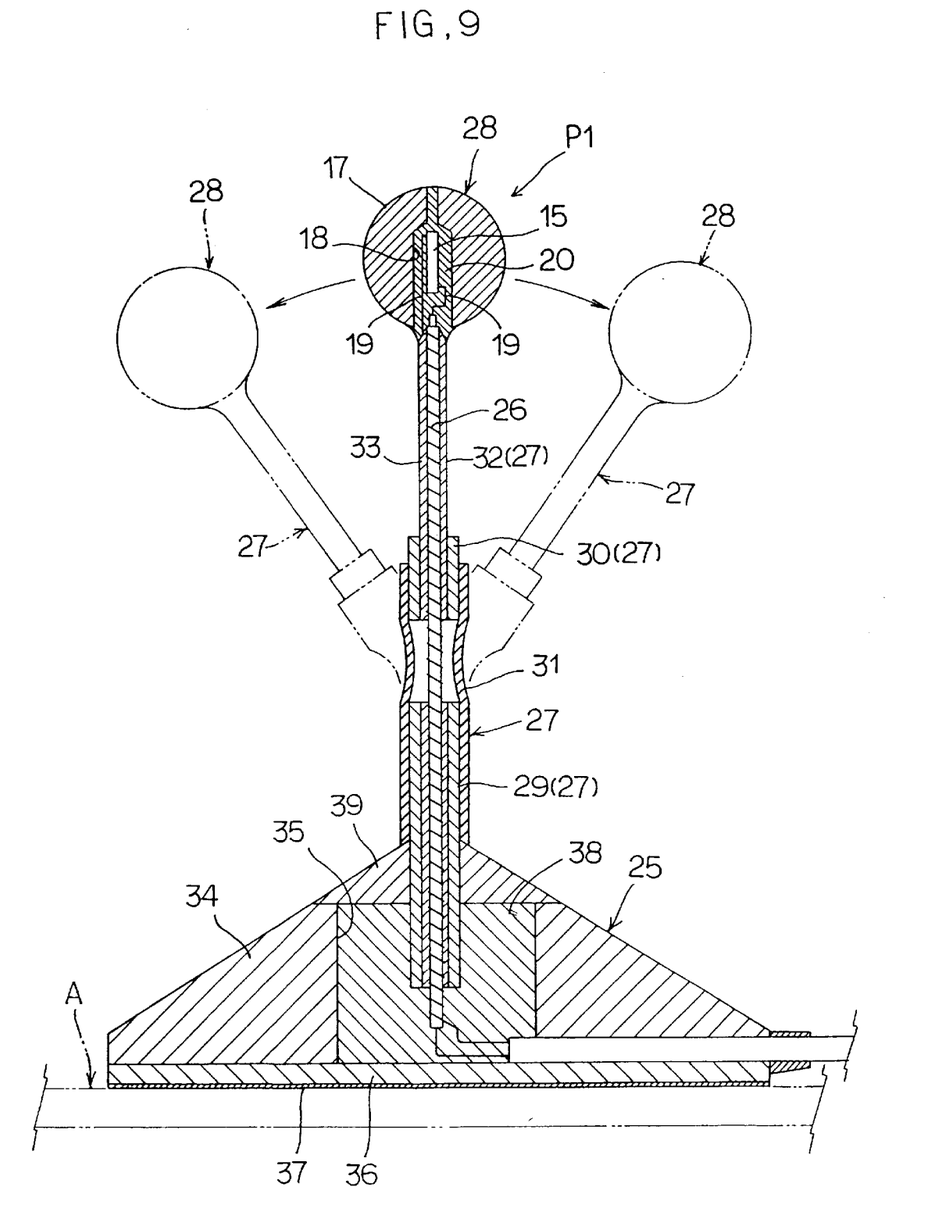
FIG. 9 is a cross-sectional view showing an attachment type probe P1 having a truncated conical mount base and a spherical probe head.
Figure 10:
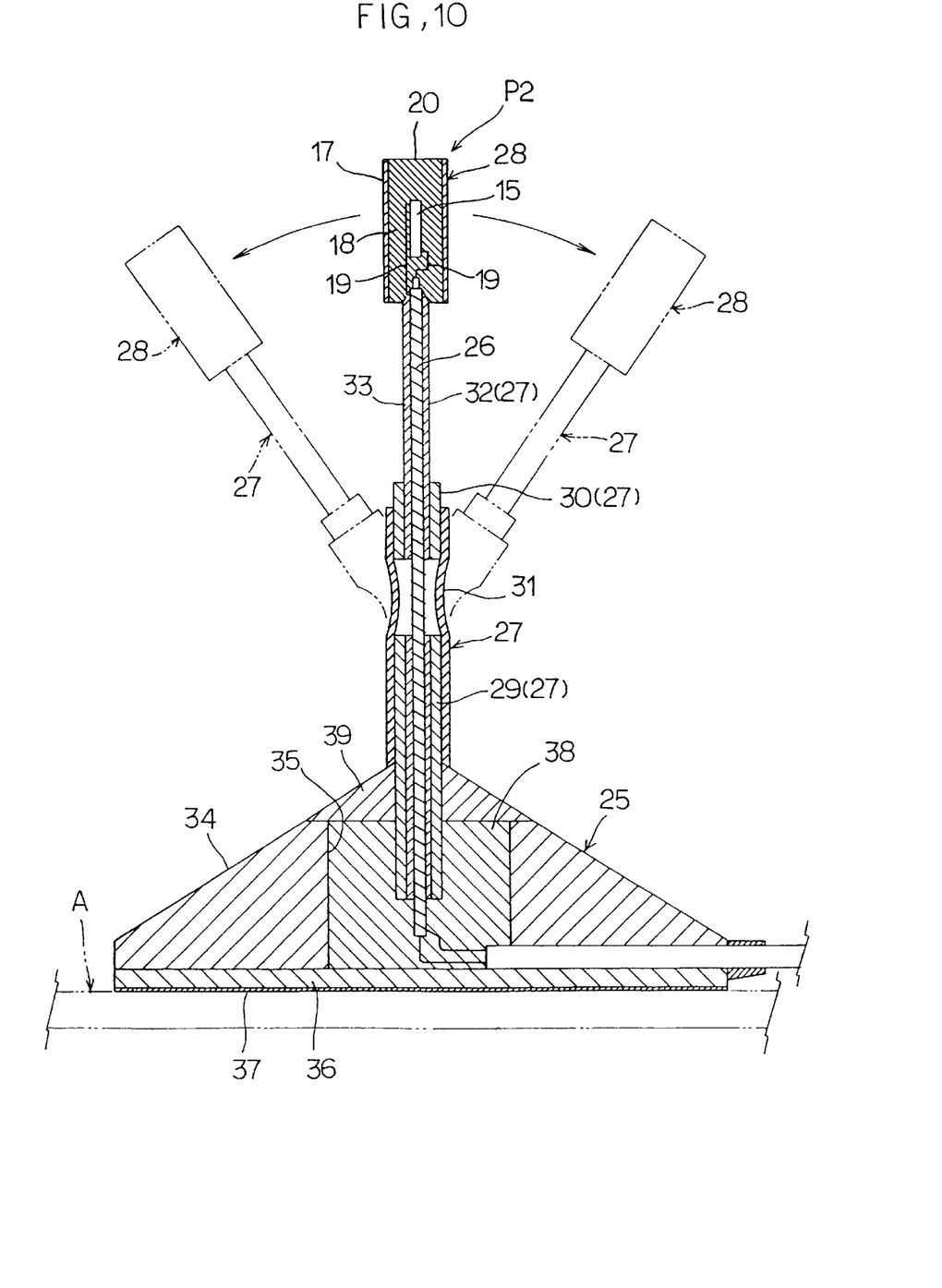
FIG. 10 is a cross-sectional view showing an attachment type probe P2 having a truncated conical mount base and a cylindrical probe head.
Figure 11:
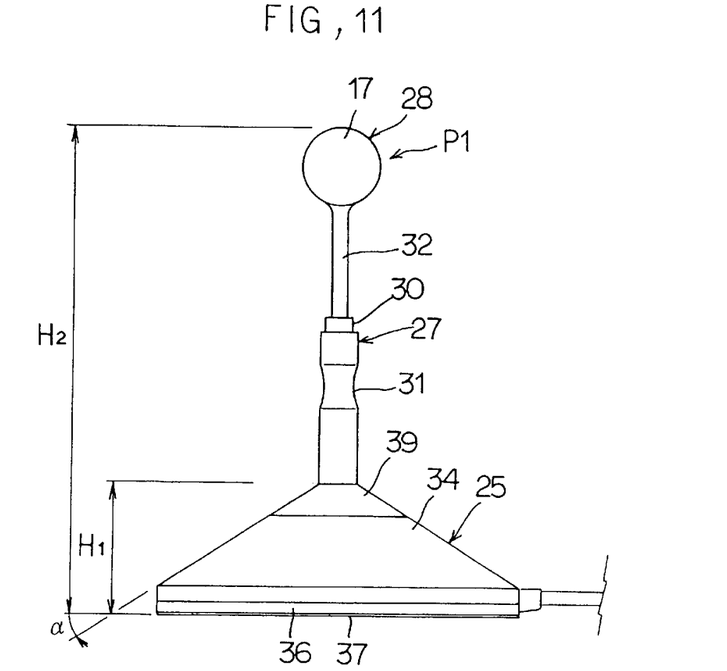
FIG. 11 is a side elevational view illustrating a relationship between a height of a mount base and a height of probe head of the probe P1.
Figure 12:
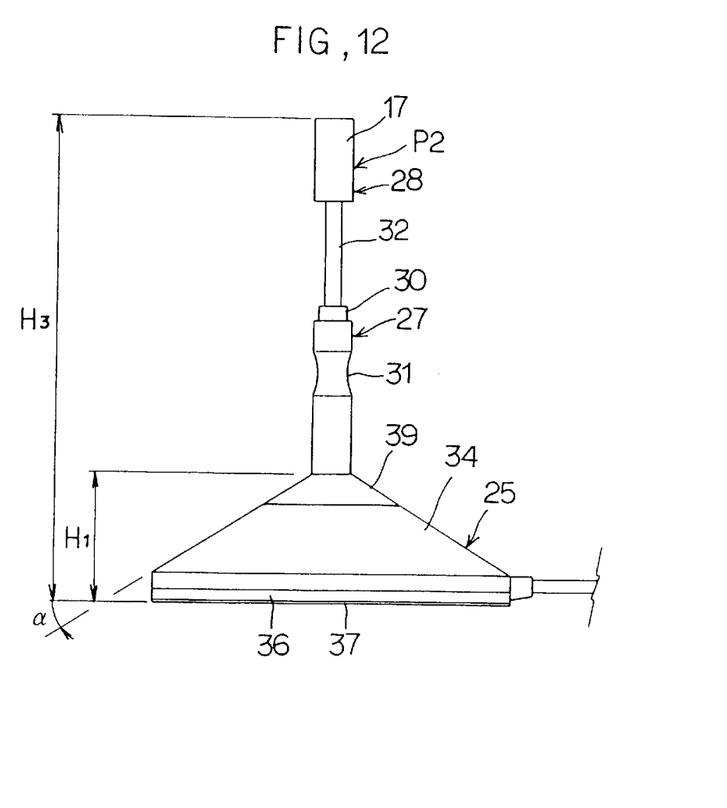
FIG. 12 is a side elevational view illustrating a relationship between a height of a mount base and a height of probe head of the probe P2.
Figure 13:
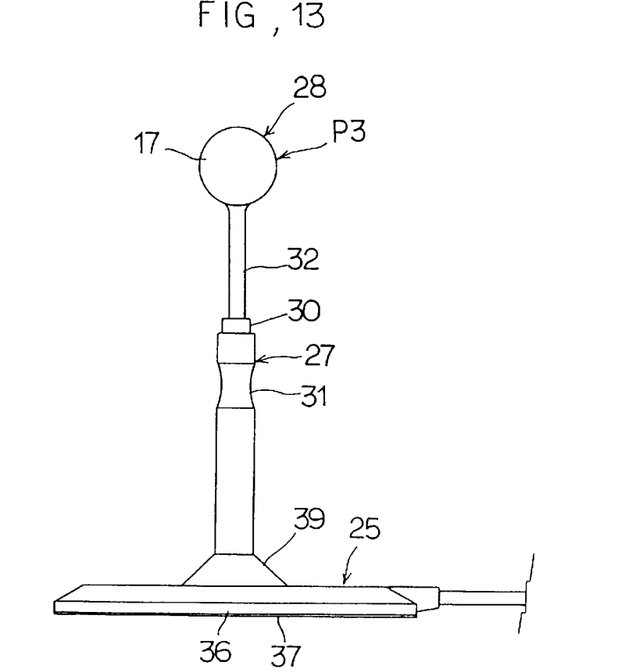
FIG. 13 is a side elevational view showing an attachment type probe P3 having a flat circular mount base and a spherical probe head.
Figure 14:
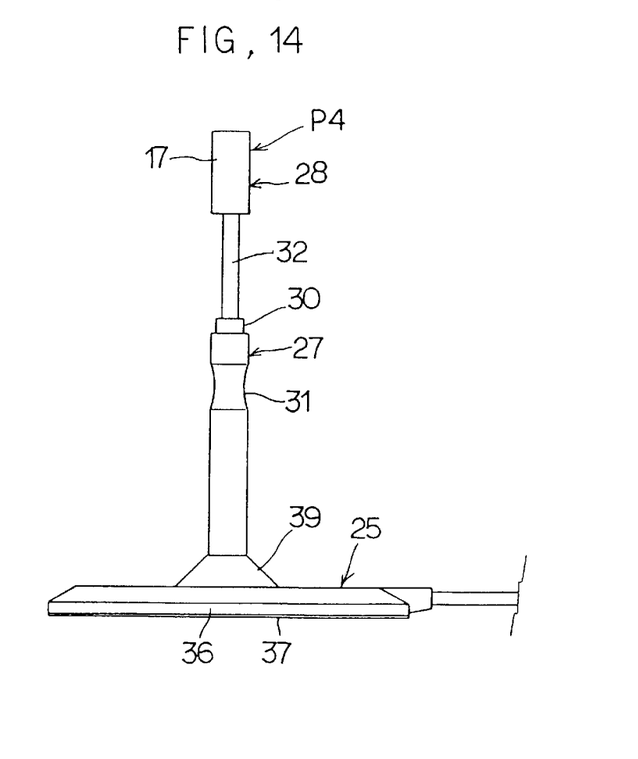
FIG. 14 is a side elevational view showing an attachment type probe P3 having a flat circular mount base and a cylindrical probe head.

Another embodiment shown in FIGS. 9 to 14 will now be described in which a support member 27 through which at least two conductive lines 26 and 26 pass is vertically provided around an upper end of a mount base 25 having an insulating property. The probe head 28 whose sensor element 15 is coated by the coating member 17 in the same manner as described above is fixed to the end of the support member 27. This is a so-called test member attachment type fluid measuring probe P. FIGS. 9, 11 and 13 show such a type that the probe head 28 is spherical and FIGS. 10, 12 and 14 show such a type that the probe head 28 is cylindrical. Also, FIGS. 9 to 12 show such a type that the mount base 25 is formed into a truncated conical shape, and FIGS. 13 and 14 show such a type that the mount base 25 is formed into a flat circular shape. It is however noted that the basic structure of the support member 27 is the same as that of the support member 3 in the foregoing embodiment.

Namely, also in this embodiment, the support member 27 is constructed so that an extending/contracting tube 31 is fitted around cylindrical members 29 and 30 having the same outer diameter and connected to each other with a predetermined distance between the cylindrical members 29 and 30. When an impact is applied at the end portion at the joint portion of the extendable tube 31, the support member 27 may be bent. The cylindrical member 29 is fixed to the truncated conical mount base 25. A tip end portion 32 having a small outer diameter is provided to the cylindrical member 30 upwardly to thereby form the support member 27. The above-described probe head 28 is fixed to the end of the tip end portion 32. In this embodiment, one of the two conductive lines 26 and 26 is a coated conductive electric wire, and the other takes such a structure that a coated conductive electric wire is wound spirally around the first coated conductive electric wire. These electric wires are coated with insulating material 33 to form the tip end portion 32. Also, the conductive lines 26 and 26 pass through the cylindrical members 29 and 30, and pass through the interior of the mount base 25 from its sides to outside.

The probe P1 shown in FIG. 9 uses the truncated conical mount base 25 and the spherical probe head 28. This mount base 25 is made of brass. A tunnel portion 35 is formed along the center of the base through the base 34 formed in the truncated conical shape. A heat insulating plate 36 made of synthetic resin is fixed onto the lower surface of the base 34. Furthermore, a cover is peeled from one surface of both sided adhesive sheet and the surface is bonded to the bottom surface of the heat insulating plate 36 to form an adhesive layer 37. Under the condition that the lower portion of the support member 27 is vertically provided in the central upper portion of the above-described tunnel portion 35, the tunnel portion 35 is filled with thermosetting synthetic resin such as epoxy resin. The resin is cured to form the fastener portion 38 for the support member 27. A resin mold layer 39 is formed so as to form a streamlined shape in its surface. The probe head 28 in this embodiment has substantially the same structure as that of the probe head 1 shown in FIG. 5. The dimensional condition for the probe P1 is as follows, for example. The diameter of the probe head 28 is 2.5 mm, the diameter of the mount base 25 is 12 mm, the height of the mount base is 4.5 mm, the length from the mount base 25 to the end of the cylindrical member 30 is 3.75 mm, its diameter is 0.5 mm, and the height from the bottom surface of the mount base 25 to the center of the probe head 28 is 15 mm.

A probe P2 shown in FIG. 10 is that the truncated conical shape is used for the mount base 25 and the cylindrical shape is used for the probe head 28. This mount base 25 is the same as that shown in FIG. 9. The cylindrical probe head 28 is so constructed that a cylinder made of metal having a high heat conductivity with an outer diameter of 1 mm and a length of 2.5 mm is used as the coating member 17. The sensor element 15 is fixed in the interior thereof with an insulating material 20 in the same manner as described above.

Since the probes P1 and P2 according to the embodiments are to be directly attached to the surface of the test piece A, the fluid along the layer portion of the test piece A is somewhat turbulent in flow by the probe. However, it is possible to measure the fluid by eliminating the adverse affect in view of the dimension and the shape of the test piece. FIG. 11 shows an example of the probe P1. The ratio of the height $H_2$ of the probe head 28 becomes twice higher than the height $H_1$ of the mount base 25 and the slant angle α of the mount base 25 is set in the range of 30° to 45°. The relationship, $H_1/H_2 \geq 2$, is found out as a result of the wind tunnel test by changing the shape of the mount base 25. It means that the probe head 28 is positioned at a height at which the turbulence of fluid by the mount base 25 is not attained. Since this value is determined with some extra value it is, therefore, possible to perform the object of the invention with a somewhat smaller level. It has been found that the result is not so affected by the shape of the mount base 25, in case of the truncated conical mount base 25, it is practically preferable to set the slant angle α in the range of 30° to 45°. Also, FIG. 12 shows the case of the probe P2. Also, in this case, if the relationship, $H_3/H_1 \geq 2$, is met, the result would be good. However, it is preferable to set the relationship, $H_3/H_1 \geq 3$.

Also, the probe P3 shown in FIG. 13 shows the mount base 25 which takes a flat circular shape. The structure of other parts thereof is the same as that of the above-described probe P1. Also, a probe P4 shown in FIG. 14 takes a flat circular mount base 25. The structure of other parts thereof is the same as that of the above-described probe P2.

Figure 15:
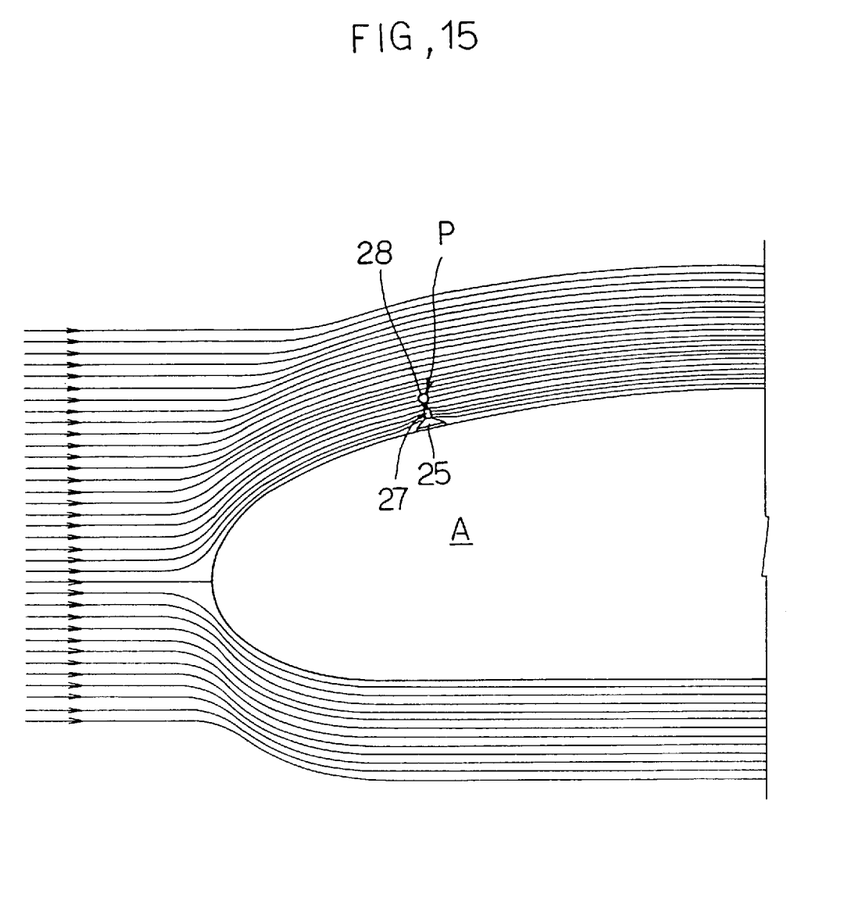
FIG. 15 is an illustration of a practical example of an attachment type probe.

A practical example for measuring the flow rate of the fluid flowing along the surface layer portion of the test piece A by using the attachment type probe P is shown in FIG. 15. It is possible to measure a distribution of a flow rate of fluid by attaching a number of probes on the surface of the test piece A.

According to the present invention, in the case where the pressure that is not less than a predetermined is applied to the fluid measuring probe, it is possible to moderate the impact force upon the collision by the bending of the support member. In addition, when the pressure is released, the support member takes the original shape. It is possible to perform the fluid measurement in the same manner as described above. It is possible to provide the fluid measurement probe that is not subjected to the conventional damage as much as possible.

Also, since the support member is divided into a plurality of cylindrical members, it is possible to insert the conductive lines into the short cylindrical members in order. In comparison with the case where the conductive lines are inserted into a single long support member, it is possible to insert the conductive lines with ease. In addition, only by coupling the plurality of members with each other by using simple extending/contracting tubes, it is possible to take a structure that the support member is bent, which is advantageous in cost aspects.

Furthermore, instead of the extending/contracting tubes, by using the support member at least part of which comprises a coil spring, it is possible to moderate the impact upon the collision in the same manner as described above. The coil spring is covered by the thin extending/contracting tube so that the outer appearance is not spoiled.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What we claim is:

1. A fluid measuring probe, comprising:

a plurality of conductive lines;

a contact type sensor element connected to said conductive lines; and a support member covering said conductive lines, wherein when a pressure that is not less than a predetermined pressure is applied to said support member in a direction perpendicular to a longitudinal direction of said support member, said support member may be bent, wherein when the pressure is released, said support member may be restored, wherein when the pressure that is not less than the predetermined pressure is not applied, said support member may maintain a predetermined posture, wherein said support member is comprised of a plurality of cylindrical members arranged at a predetermined interval along a straight line, and wherein said adjacent cylindrical members are connected to each other by at least one bendable member, said bendable member determining the predetermined pressure in which the support member bends.

2. The fluid measuring probe according to claim 1, wherein said bendable member is an extending/contracting tube.

3. The fluid measuring probe according to claim 1, wherein said bendable member is a coil spring, and said coil spring is covered by a thin extending/contracting tube for connecting the adjacent cylindrical members to each other.

4. The fluid measuring probe according to claim 1, wherein said sensor element comprises a sensor element for detecting a flow rate of fluid, said sensor element being made of a piece of germanium mono-crystalline semiconductor.

5. The fluid measuring probe according to claim 1, wherein said sensor element comprises a thermistor temperature sensor element for detecting a temperature of fluid.

6. A test member attachment type fluid measuring probe, comprising:

a support member;

at least two conductive lines passing through said support member;

a mount base, for accommodating thereon said support member, having a heat insulating property; and a probe head having a sensor element which is coated with a coating member, said probe head being fixed to a tip end of said support member, wherein when a pressure that is not less than a predetermined pressure is applied to said support member in a direction perpendicular to a longitudinal direction of said support member, said support member may be bent, wherein when the pressure is released, said support member may be restored, wherein when the pressure that is not less than the predetermined pressure is not applied, said support member may maintain a predetermined posture, wherein said support member is comprised of a plurality of cylindrical members arranged at a predetermined interval along a straight line, and wherein said adjacent cylindrical members are connected to each other by at least one bendable member, said bendable member determining the predetermined pressure in which the support member bends.

7. The fluid measuring probe according to claim 6, wherein said bendable member is an extending/contracting tube.

8. The fluid measuring probe according to claim 6, wherein said mount base is formed in a truncated conical shape or a flat circular shape.

9. The fluid measuring probe according to claim 6, wherein an adhesive layer or a viscous layer is formed on a bottom surface of said mount base.

10. The fluid measuring probe according to claim 6, wherein said probe head is spherical or cylindrical.

11. The fluid measuring probe according to claim 6, wherein said sensor element comprises a sensor element for detecting a flow rate of fluid, said sensor element being made of a piece of germanium mono-crystalline semiconductor.

12. The fluid measuring probe according to claim 6, wherein said sensor element comprises a thermistor temperature sensor element for detecting a temperature of fluid.

* * * * *